United States Patent
Micheron et al.

[11] 3,940,201
[45] Feb. 24, 1976

[54] STORAGE-TYPE ELECTRO-OPTICAL MODULATOR

[75] Inventors: Francois Micheron; Philippe Bied-Charreton, both of Paris, France

[73] Assignee: Thomson-CSF, Paris, France

[22] Filed: May 22, 1974

[21] Appl. No.: 472,307

[30] Foreign Application Priority Data
May 29, 1973 France .............................. 73.19496

[52] U.S. Cl. ........ 350/3.5; 340/173 LM; 340/173.2; 350/150; 350/160 R
[51] Int. Cl.² ...................... G02F 1/03; G03H 1/04
[58] Field of Search .......... 350/150, 3.5; 340/173.2, 340/173 LM

[56] References Cited
UNITED STATES PATENTS 3,609,002  9/1971  Fraser et al. ..................... 350/157 X
3,806,895  4/1974  Tomisawa et al. ............ 340/173 LM Primary Examiner—John K. Corbin
Attorney, Agent, or Firm—Cushman, Darby & Cushman

[57] ABSTRACT

A high operational reliability modulator, constituted by a mosaic of elements having variable double-refraction properties. It comprises, on a flat ferroelectric ceramic structure and in respect of each element, a first conventional pair of transparent electrodes and a second pair of distinct electrodes, made of transparent photoconductive material; by the application of illumination, the second electrodes are rendered conductive exclusively at the required instant, thus avoiding any interim disturbance to the action of the first electrodes and enabling the change of double-refraction properties of the ceramic.

11 Claims, 7 Drawing Figures

STORAGE-TYPE ELECTRO-OPTICAL MODULATOR

The present invention relates to storage-type electro-optical modulators and to their applications in optical systems for displaying or storing information.

A modulator of this kind generally comprises a thin flat structure constituted by a base material coated with transparent electrodes. This structure can be considered as comprising one or more adjacent elements which are, each of them, capable of successively adopting one or the other of two stable states characterized by optical properties which differ notably from one another for the two states (a bistable optical system).

By way of example, one can point to the transition from the vitreous (transparent) state to the opaque crystallized state, which occurs in certain semiconductors, and also to the double-refracting states characteristic of liquid crystals and ferroelectric materials.

Those skilled in the art will be aware that the variations associated with the phenomenon of double-refraction are utilised in order to produce extinction of a light ray in a given trajectory in which there are successively arranged a polarizer, a controlled double-refraction device and an analyzer which is in a "crossed" relationship with the polarizer.

In a storage-type optical modulator, the points defining an image specific to the input information, are materialized by a mosaic of modulator elements. These elements, in an otherwise homogeneous structure, are usually defined by the intersections between two networks of transparent electrodes deposited for example "in rows" on one broad face of the thin structure, and "in columns" on the opposite face. By means of electrical control it is possible to selectively bring about in the different elements of the mosaic, the transition from one to the other of the stable states in order to make up point by point a predetermined image. It is also possible to erase the image by placing all the elements in one of the stable states, called the 0 state, the other stable state then being known as the 1 state.

The object of the invention is to produce a storage-type electro-optical modulator which exhibits:

a high degree of uniformity when the elements are in a given state;

a high reliability of response to the control pulses which are responsible for bringing about a change in state.

It has been found, in other words, that in known modulators there are considerable drawbacks. These, in certain of the known modulators one of the stable states is produced by applying a permanent mechanical stress to a base material. The material will for example take the form of a plate of transparent ferro-electric ceramic which has previously been stuck to a plate of vitreous material (a transparent organic polymer); the plate and consequently the ceramic plate, is given a permanent curvature. The other stable state is achieved by means of an electrical control acting upon transparent electrodes previously laid upon the device. A system of this kind suffers from a lack of uniformity because in practice the mechanical stress transmitted by the bonding agent, is non-uniform.

In other ferro-electric modulators, there are two sets of electrodes. A first set creates an electrical bias perpendicular to the large faces. The second set is constituted for example by electrodes in rows deposited upon one of the large faces and electrodes in columns deposited upon the opposite face. A mosaic element is defined by the intersection between a row and a column. The first set of electrodes is constituted for example by two interdigital networks of metallic electrodes deposited upon only one of the large faces and forming columns interspersed with the columns of the other set. The defect which is encountered here is as follows: the presence of the electrodes of the second set disturbs the orientation of the bias or polarization vector in the zone located at the intersection between a row and a column belonging to the first set of electrodes.

The invention overcomes the aforementioned drawbacks by employing an arrangement of two sets of electrodes one of which has a particular make-up.

According to the present invention, there is provided a storage-type electro-optical modulator, designed for modulating a radiated energy beam under the control of electrical input signals, said modulator comprising a plate of homogeneous material capable of transfer, under the action of an electric field, from a first stable state exhibiting certain optical properties to a second state exhibiting different optical properties; said plate having two large faces and being equipped, parallel to one of said faces, with a first network of parallel coplanar electrodes interconnected for forming two interdigital comb structures, and with a second network of distinct coplanar electrodes interleaved with those of the first network; said plate furthermore being equipped, parallel to the other of said faces and at the opposite side to said first and second networks, with a third network of distinct coplanar electrodes parallel with a direction making an angle with the direction of the electrodes of said second network; the electrodes of said second and third networks being constituted by a photoconductive material transparent to said radiated energy beam; said modulator further comprising illuminating means, provided to drive conductive said photoconductive material during a phase of selective application of said electrical input signals to the electrodes of said second and third networks, said illumination means being occulted during the erase phase, during which an erase voltage is applied between said comb structures.

For a better understanding of the invention and to show how the same may be carried into effect, reference will be made to the following description and the attached figures, among which:

Figure 5:
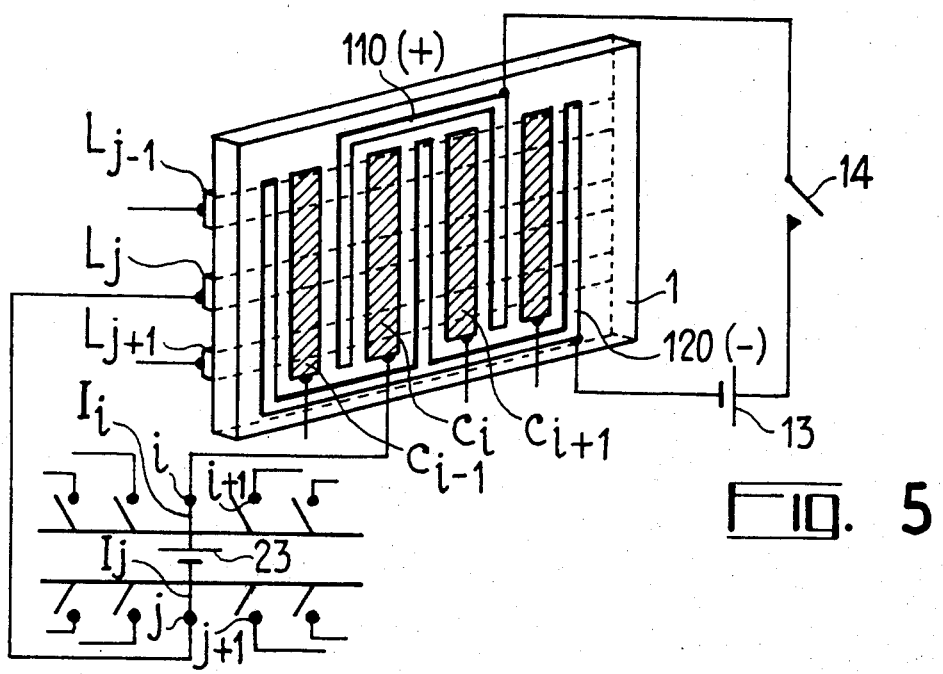
Figure 6:
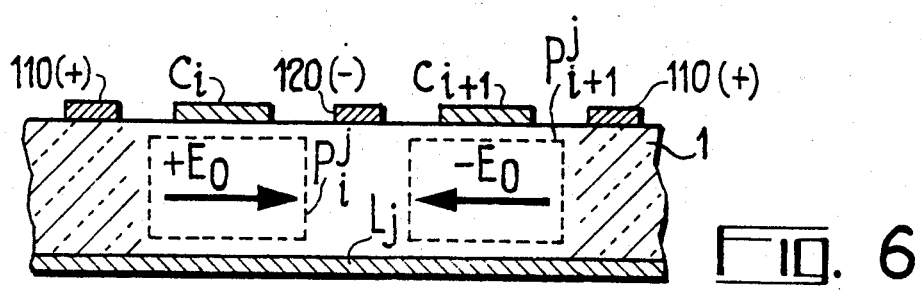
Figure 7:
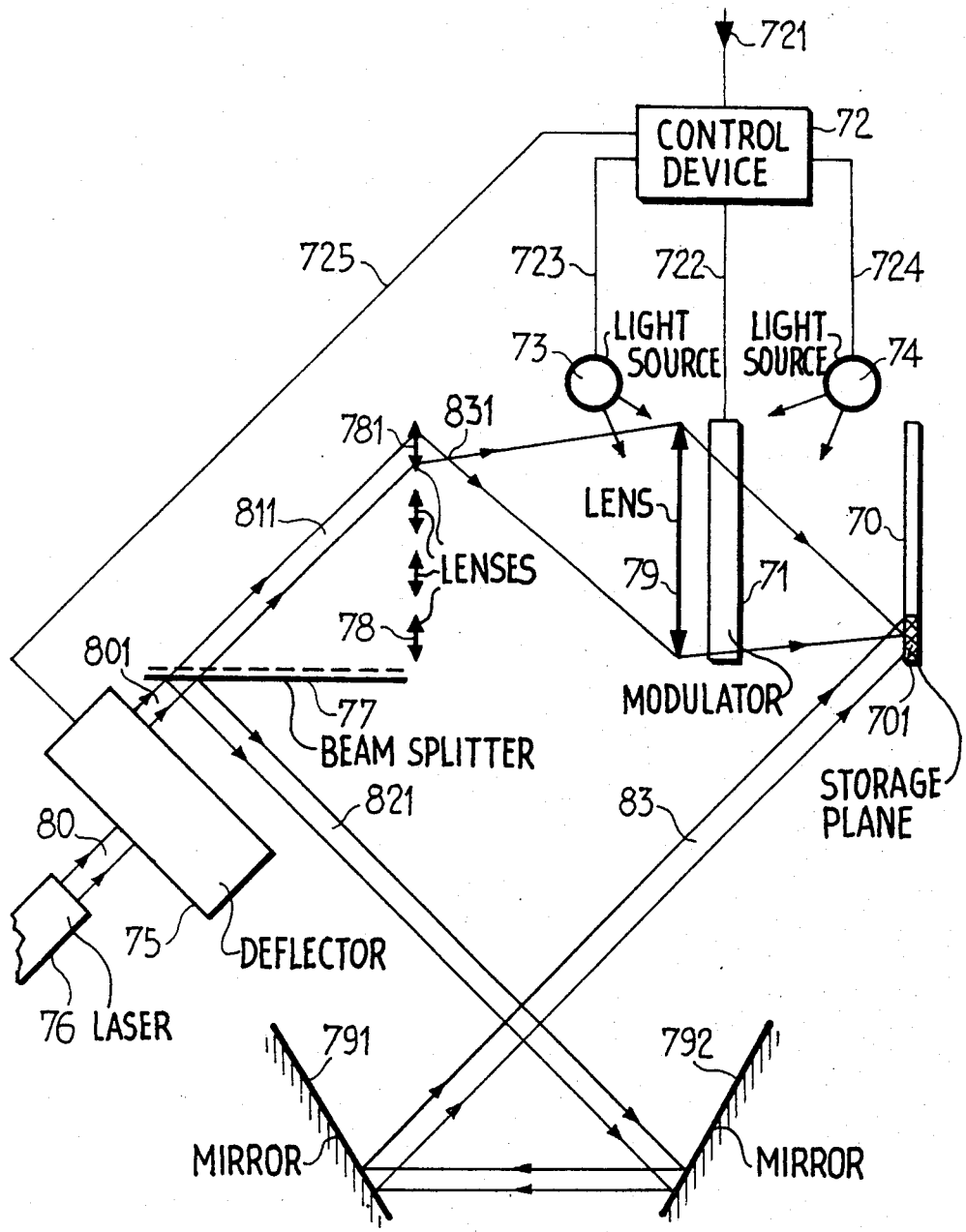

FIGS. 5 and 6 schematically illustrate an optical display system in accordance with the invention;

FIG. 7 illustrates an example of a data storage system.

Figure 1:
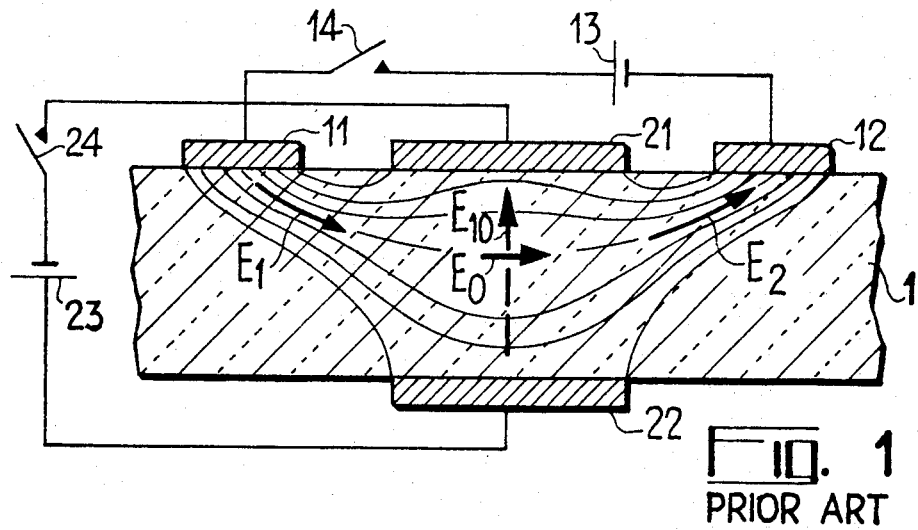
FIG. 1 is a diagram explaining the prior art.

In FIG. 1, a known electro-optical modulator structure has been shown. It comprises a plate 1 of transparent ferro-electric ceramic, for example of lead and lanthanum titaniumzirconate, in which two stable double-refraction states are produced by the use of a special electrode arrangement.

The modulator comprises two sets of electrodes. The first set comprises transparent electrodes 11 and 12 of indium oxide for example, located on one and the same large face. The second set comprises electrodes 21 and 22, likewise transparent, located on two opposite large faces of the plate 1 and disposed opposite one another, the electrode 21 being arranged between the electrodes 11 and 12. The assembly of four electrodes 11, 12, 21 and 22, constitutes an element of the mosaic which forms the modulator. A circuit comprising a d.c. voltage source 13 and a contact-breaker 14, applies to the electrode 11 a positive polarity and to the electrode 12 a negative polarity. A circuit comprising a d.c. voltage source 23 and a contact-breaker 24 applies to the electrode 21 a negative polarity and to the electrode 22 a positive polarity.

The electric field in the situation in which solely the electrodes 11 and 12 are live, has been shown in full line. It will be seen that due to the presence of the electrodes 21 and 22 (although these are not biased) the lines of force starting from the electrode 11 separate further and further apart until the electrodes 21 and 22 are encountered, after which they bunch together again on their way to the electrode 12. The references $E_1$ and $E_2$ have been used to designate the electric field vectors in the neighbourhood of the interval separating the electrodes 11 and 21, on the one hand, and that separating the electrodes 21 and 12 on the other hand. In the zone located between the electrodes 21 and 22, there is a mean field represented by the vector $E_o$, which is substantially weaker than the fields $E_1$ and $E_2$. By supplying the electrodes 21 and 22 and cutting off the supply to those 11 and 12, a field $E_{10}$ perpendicular to that $E_o$ and substantially stronger than the latter, is created. The operation of the device is then seen to embody the following defect: if, by applying a voltage to the electrodes 21 and 22, a polarization is induced in the material with an orientation of the kind indicated by the vector $E_{10}$, then it will be difficult to produce a change in state in the polarization to accord with the orientation of the vector $E_o$ due to the weakness of that field $E_o$. If it is sought to overcome this difficulty by increasing the voltage of the source 13, then a corresponding increase is produced in the fields $E_1$ and $E_2$ and a restriction is then imposed by the risk of breakdown.

Figure 2:
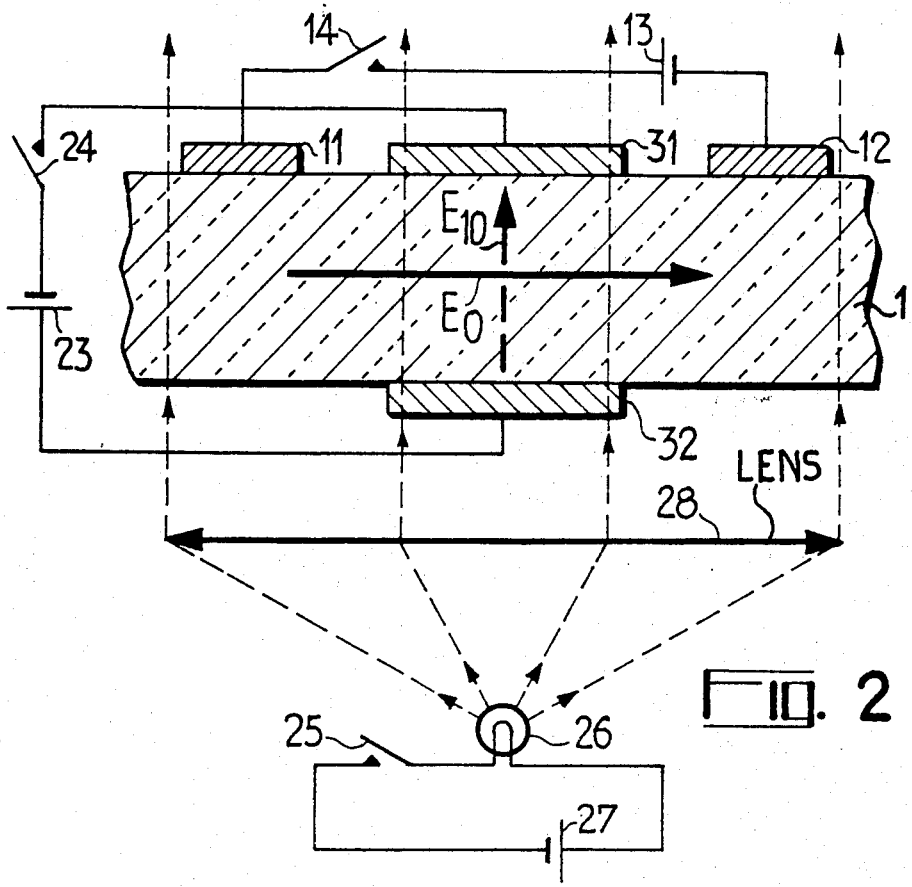
FIG. 2 illustrates a schematic section through a modulator element in accordance with the invention.

In FIG. 2, a structure similar to that of FIG. 1 has been shown but in which the electrodes 21 and 22 have been replaced by electrodes 31 and 32 of transparent photoconductive material. Materials of this kind are well known, including for example the mineral compounds CdS, ZnS and CdSe, solid solutions of these compounds taken in pairs (or altogether), or, again, an organic polymer: polyvinyl carbazole.

In FIGS. 1 and 2, identical elements have been illustrated by identical references. However, the dimensions of the device shown in FIG. 2 are modified in relation to the former device, as follows:

the thickness of the plate 1 has been reduced;

the width of the electrodes 11 and 12 which define the boundary between two elements of the mosaic employed to compose the image, has been reduced.

The device has been supplemented by an illumination system comprising a radiation energy source 26 supplied from an electrical accumulator 27 under the control of a contact-breaker 25. The rays emitted by the source 26 are rendered parallel by a lens 28 and directed perpendicularly to the flat structure 1. These rays have a dual purpose:

a. they act as a light source for the projection of the image;

b. they excite the photoconductive material in order to momentarily give it a resistivity which is compatible with the field electrode function which it is to perform.

The operation of the modulator is as follows:

1 - in order to achieve the double-refraction state corresponding to the electric field $E_o$, the contact-breaker 14 is closed, the contact-breakers 24 and 25 being open. The plate 1 being darkened, the electrodes 31 and 32 act as insulators and field $E_o$ is substantially uniform. In other words, the field is not disturbed by the presence of nonconductive electrodes and, on the other hand, since the plate 1 is very thin, the field distribution differs very little from that it would be between two mutually opposite electrodes and in addition, the field $E_o$ is of an order of magnitude comparable with those of the fields $E_1$ and $E_2$ in FIG. 1.

2 - in order to achieve the double-refraction state corresponding to the electric field $E_{10}$, the contact-breaker 14 is opened and those 24 and 25 are closed. The field $E_{10}$, which is perpendicular to the field $E_o$, then induces a polarization in a direction perpendicular to the flat structure 1 and this considerably reduces the double-refracting property of the base material. It is to be noticed that a prefered embodiment for the thickness of the base material is such that the difference (dn) between the two stable double-diffraction states produces a maximum phase shifting, said thickness being given by $e = \lambda/2.dn$.

Self-evidently, in the case of a mosaic, the illumination system can be a single one, the dimensions of the lens 28 then being matched to those of the mosaic, although by the same token there will be as many contact-breakers 24 as there are elements in the mosaic, each of these contact-breakers having to be independent.

Figure 3:
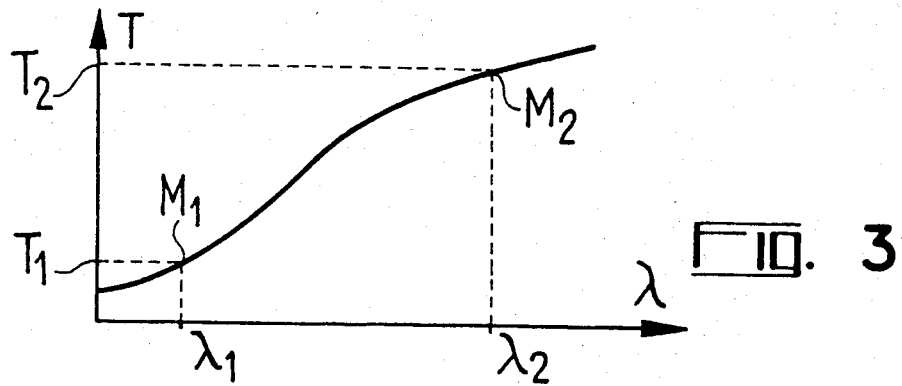
FIG. 3 is an explanatory graph.

In the embodiment shown in FIG. 2, a single radiated energy source is used. The choice of the wavelength of the light emitted is a particularly delicate matter. In other words, the transparency of the photoconductive material increases with the wavelength as the graph of FIG. 3, being a rectangular two-ordinate system, shows: the wavelength $\lambda$ (plotted on the abscissa) and the transmission factor T (plotted on the ordinates). The graph rises between the two points illustrated: $M_1$ ($\lambda_1$, $T_1$) corresponding to radiation of short wavelength (blue or violet or even ultraviolet) and $M_2$ ($\lambda_2$, $T_2$) corresponding to radiation of a wavelength located in the central part of the visible spectrum.

It is therefore of interest to utilise the latter radiation. Unfortunately, if one studies the ratio k of the resistivities of the material respectively in the dark condition and when illuminated, it will be found that $k$ has a variation which is the reverse of that corresponding to FIG. 3. In fact, $k$ increases by several orders of magnitude ($10^6$ to $10^7$) as the wavelength decreases from $\lambda_2$ to $\lambda_1$. It is desirable, therefore, to exploit the photoconductive properties of the material by illuminating it with radiation of very short wavelength, if possible ultra-violet, whilst for example a yellow light source will be used for the display or projection of the image via the modulator.

The use of two radiated energy sources operating at different wavelengths, gives rise to the embodiment schematically shown in FIG. 4 where we see once again the elements of FIG. 2 plus additional elements. Amongst these latter there is a radiation energy source 43 supplied from an electrical accumulator 42 under the control of a contact-breaker 41. The two faces of the modulator are illuminated obliquely, however at not too acute an angle of incidence, by means of two optical systems arranged either side of the source 43, comprising lenses 44 and 45 disposed respectively between the source 43 and mirrors 46 and 47 which reflect the light on to the electrodes 31 and 32. It would be equally possible to direct the light perpendicularly to the electrodes, using additional, semi-transparent mirrors.

Figure 4:
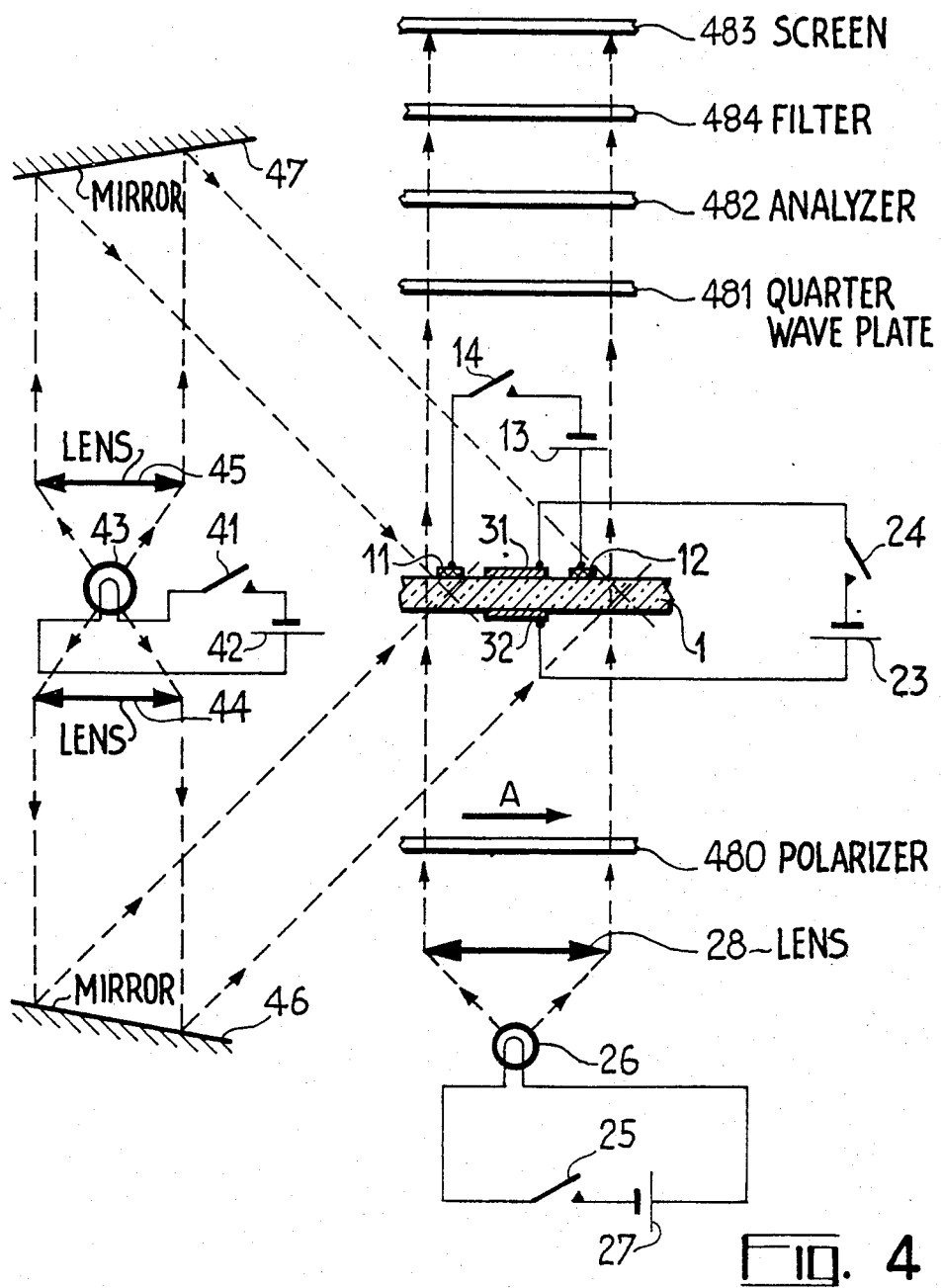
FIG. 4 illustrates a variant embodiment of the invention.

In addition, in FIG. 4 a system for projecting and polarising the light used to compose the image, can be seen. There, in addition to the light source 26 already referred to, there can be seen a rectilinear polarizer 480 (Nicol prism or polarizer plate), arranged between the source 26 and the plate 1, and then beyond that a quarterwave double-refracting plate 481 and an analyser 482 (Nicol prism or polarizer plate). Finally, beyond the analyser 482 there is a filter 484 which illuminates the light from the source 43, and an image projection screen (marked 483).

The operation of the modulator is similar to that described in relation to FIG. 2, the contact-breaker 41 being operated, moreover, in the same fashion as the contact-breaker 25. As far as those elements of the flat structure 1 which are to remain dark, are concerned, the illumination of the electrodes 31 and 32 has no effect as long as the contact-breaker 24 (FIG. 2) is not closed, that is to say as long as the electrodes 31 and 32 are not live.

The polarizer 480 is designed for rectilinearly polarizing the light from the source 26, along a direction A which makes an angle $(\pi/4)$ with the neutral lines of the plate 1. The plate 1, in its first stable double-refraction state, drives elliptical the polarization of the emergent light, and in its second stable double-refraction state, transmits a light whose polarization is quasi rectilinear (practically: lightly elliptical) parallel to A. The quarter wave plate 481 in said first stable state of the plate 1, linearises again the polarization in a parallel direction to A, and in said second stable state, drives elliptical the polarization. At last, the analyzer 482 is crossed with the polarizer 480: in other words, in said first state, it does not transmit any light, whereas in said second state it always transmits a light component, polarization of which is perpendicular to the direction A.

The operation explained hereinbefore is relating to a monochromatic light source 26. When a polychromatic light source is involved, of course a total extinction is not obtainable, but only the absorption of one wavelength.

In FIGS. 5 and 6 there has been schematically illustrated an optical display system in accordance with the invention showing only a few columns and rows of the modulator. The light sources as well as the illumination and projection systems, have not been shown.

In FIG. 5, on a first large face of the plate 1, there can be seen column electrodes $C_{i-1}$, $C_i$, $C_{i+1}$, and on the opposite large face, row electrodes $L_{j-1}$, $L_j$, $L_{j+1}$. Furthermore, there can be seen electrodes similar to those 11 and 12 of FIGS. 2 and 4, in the form of two comb structures 110 (+) and 120 (−) respectively connected to the + and − poles of the source 13 under the control of the contact-breaker 14. The teeth of the comb structures are interleaved and, moreover, between two successive electrodes 110 and 120, there is a column, such as that $C_i$.

In FIG. 6 the plate 1 can be seen, cut by a perpendicular plane longitudinally sectioning electrode $L_j$, so that at the opposite face there appear the transverse sections of the electrodes 110, $C_i$, 120, $C_{i+1}$, 110, etc.

The application of a voltage to the electrodes $C_i$ and $L_j$ by the source 23, is effected with the help of a switch which comprises a double set of contact-breakers such as those $I_i$ connecting the + pole to the column $C_i$ in one set, and those $I_j$ connecting the − pole to the row $L_j$ in the other set.

Operation of the system comprises the following phases which take place in alternation:

1 - the erase or reset phase:

Electric fields parallel to the plane of the structure are produced in order to create in all the elements the maximum double-refraction condition. In FIG. 6, the fields $+E_o$ and $-E_o$ created in two neighbouring elements by the set of alternating electrodes 110 and 120, can be seen. Broken lines have been used to show the centre zones $P_{i,j}$ and $P_{i+1,j}$ corresponding to the elements of the mosaic which have the respective coordinates $(i, j)$ and $(i+1, j)$. If a ferro-electric material has been chosen which has crystalline symmetry, and this is the case for example with lead and lanthanum titanium-zirconates, the two double-refraction states will be virtually identical in the two neighbouring elements.

2 - selection of the image elements:

The row and column photoconductive electrodes are driven conductive by illuminating them. The selection of the elements $(i, j)$ whose double-refraction state is to be modified, is effected by application of the opposite polarities of the source 23, respectively to the rows and the columns $L_i$ and $C_j$. To prevent all the intersections between several rows and several columns which have been rendered live, from being selected simultaneously, recourse is had to the sequential method indicated hereinafter.

The projection of the illuminating light produced by the modulator onto a screen, results in a certain luminous intensity in respect of the selected elements whilst the other elements remain dark. Thus, a data page has been produced.

The system can be improved in two ways which have recourse to known techniques:

a. input to the elements is effected sequentially, either row by row or column by column, using a system of gates controlled by a computer. The selection phase then involves complete scanning of the mosaic without any interruption for resetting purposes.

b. those skilled in the art will be aware that elements which are neighbours of a selected element, these elements also being referred to as "half-set", are disturbed since they adopt an intermediate polarization state producing an intermediate state of double-refraction. This drawback can be overcome by using this intermediate state as the 0 state. This technique has been explained in detailed fashion in the article entitled "Active compensators for ferro-electrics optical circuits" by G. W. TAYLOR et al. which appeared in the magazine "FERRO-ELECTRICS" 1971 volume 2, pages 101 to 112, published by GORDON and BREACH (Norwich, Great Britain).

The optical system in accordance with the invention can be utilised to effect the storage of information in a storage plane 70 (FIG. 7) which is capable of holding a large number of data pages made up successively with the help of a modulator 71 in accordance with the invention.

FIG. 7 schematically illustrates the essential elements of this kind of system, in accordance with a non-limitative embodiment. The storage plane 70 will, for example, be a photographic plate capable of recording a matrix of holograms 701, each of these corresponding to a data page. The data for storage are introduced, page by page, in the form of electrical signals supplied to the input 721 of an electrical control device 72 connected by a cable 722 to the modulator 71 and by connections 723 and 724 to light sources 73 and 74 emitting at the wavelength of illumination of the photoconductive electrodes. The device 72 is connected by a cable 725 to an electro-optical light deflector 75 of known kind, arranged before a laser 76. Between the deflector 75 and the storage plane 70, there are successively disposed a beam-splitter system such as a semi-transparent plate 77, a matrix of holographic lenses 78, and an objective lens 79.

The operation of the system is as follows: for a given data page, which is to be stored for example at 701 in the storage plane 70, the device 72 acts upon the deflector 75 which receives a beam of parallel, monochromatic light 80, from the laser 76. The emergent beam then occupies a predetermined position 801 and gives rise, after splitting by the plate 77, to the beams 811 and 821. The beam 821 acts as a reference beam and is accordingly supplied to 701 by means of a set of mirrors 791 and 792. The beam 811 is focused by a lens 781 of the matrix 78 in order to form an illumination source 831 an image of which is formed at 701 by the objective lens 79, after passing through the modulator 71.

During the phase of input or writing in of the data corresponding to a data page, the sources 73 and 74 illuminate the photoconductive electrodes of the modulator 71. These are extinguished during the erase phase. The modulator is then available again for the storage of a new data page.

The invention is applicable to the field of display techniques, in particular to the production of electronically composed images, and to the field of information-processing utilising optical write-in, read-out and computing means.

What we claim is:

1. A storage-type electro-optical modulator, designed for modulating a radiated energy beam under the control of electrical input signals, said modulator comprising: a plate of homogeneous material capable of switching, under the action of an electric field, from a first stable state exhibiting certain optical properties to a second state exhibiting different optical properties; said plate having two large faces and being equipped, parallel to one of said faces, with a first network of parallel coplanar electrodes interconnected for forming two interdigital comb structures, and with a second network of distinct coplanar electrodes interleaved with those of the first network; said plate furthermore being equipped, parallel to the other of said faces and at the opposite side to said first and second networks, with a third network of distinct coplanar electrodes parallel with a direction making an angle with the direction of the electrodes of said second network; the electrodes of said second and third networks being constituted by a photoconductive material transparent to said radiated energy beam; said modulator further comprising illuminating means, provided to drive conductive said photoconductive material during a phase of selective application of said electrical input signals to the electrodes of said second and third networks, and electrical erase means energizing said first network of parallel coplanar electrodes during an erase phase, means being provided for shutting off said illumination means during said erase phase.

2. A modulator as claimed in claim 1, wherein said material which can occupy two stable states, is of the variable double-refraction kind, the variation in the phenomenon being induced by an electric field.

3. A modulator as claimed in claim 2, wherein said material is a ferro-electric ceramic.

4. A modulator as claimed in claim 3, wherein said ferro-electric ceramic is a lead and lanthanum titaniumzirconate.

5. A modulator as claimed in claim 1, wherein said photoconductive material is constituted by at least one chemical element of the following group: Cd S, Cd Se, Zn S and polyvinyl carbazole.

6. An optical display system for displaying data which are under the form of electrical control signals, said system comprising a storage-type electro-optical modulator as claimed in claim 1, and a radiated energy source furnishing said radiated energy beam for reading out the displayed data.

7. A display system as claimed in claim 6, wherein said radiated energy source is combined with said illuminating means.

8. A display system as claimed in claim 6, wherein said illuminating means are constituted by a further radiated energy source, said radiated energy source emitting a radiation of a predetermined wavelength such that the transmission factor of said photoconductive material vis-a-vis said predetermined wavelength, is located in the upper part of its range of variation, and said further source emitting a radiation of a different wavelength smaller than said predetermined wavelength; said photoconductive material, when the radiation of said further radiated energy is incident upon it, having a conductivity which is much higher than that which it has when it is the dark condition.

9. An information storage system of electrical data, comprising at least one optical system as claimed in claim 6.

10. A storage system as claimed in claim 9, comprising at least one laser emitting a radiated energy beam for writing and reading out said data, a beam splitter receiving said beam from said laser and furnishing an object beam and a reference beam, an objective lens associated to said modulator for transmitting and modulating said object beam and a holographic storage medium for storing said data, receiving said reference beam and the modulated object beam.

11. An information storage system as claimed in claim 9, further comprising associated means for optically storing said electrical data in the form of holograms.

* * * * *